United States Patent
Inoue et al.

(10) Patent No.: US 10,246,010 B2
(45) Date of Patent: Apr. 2, 2019

(54) ULTRASONIC SENSOR AND OBSTACLE DETECTION APPARATUS

(71) Applicant: MITSUBISHI ELECTRIC CORPORATION, Tokyo (JP)

(72) Inventors: Satoru Inoue, Tokyo (JP); Takashi Ohsawa, Tokyo (JP); Masato Kurahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/749,566

(22) PCT Filed: Aug. 31, 2015

(86) PCT No.: PCT/JP2015/074713
§ 371 (c)(1),
(2) Date: Feb. 1, 2018

(87) PCT Pub. No.: WO2017/037838
PCT Pub. Date: Mar. 9, 2017

(65) Prior Publication Data
US 2018/0222382 A1    Aug. 9, 2018

(51) Int. Cl.
*B60Q 1/52*    (2006.01)
*B60R 19/48*   (2006.01)
(Continued)

(52) U.S. Cl.
CPC ............ *B60Q 1/525* (2013.01); *B60Q 1/52* (2013.01); *B60R 19/48* (2013.01); *B60R 19/50* (2013.01);
(Continued)

(58) Field of Classification Search
CPC .......... B60Q 1/525; B60Q 1/52; B60R 19/48; B60R 21/00; B60R 21/013; G01S 15/931
(Continued)

(56) References Cited

U.S. PATENT DOCUMENTS 5,303,205 A  *  4/1994  Gauthier  ............. B60Q 1/0023
                                                  367/108
6,072,391 A      6/2000  Suzuki et al.
6,128,576 A  *  10/2000  Nishimoto  ............... G01S 7/56
                                                  340/435

FOREIGN PATENT DOCUMENTS

DE    19623469 A1    1/1997
DE    10338840 A1    1/2006
(Continued)

OTHER PUBLICATIONS

International Search Report, issued in PCT/JP2015/074713, PCT/ISA/210, dated Oct. 13, 2015.

*Primary Examiner* — John A Tweel, Jr.
(74) *Attorney, Agent, or Firm* — Birch, Stewart, Kolasch & Birch, LLP (57) ABSTRACT

An ultrasonic sensor (10) includes a transmission and reception unit (11) for transmitting and receiving an ultrasonic wave, a holder (12) and an attachment (13) for fixing the transmission and reception unit (11) to the bumper (1) of a vehicle, and light source units (14a, 14b) mounted in a back side of the bumper (1). The holder (12) is shaped so as to be exposed on a surface of the bumper (1), and guides light beams emitted by the light source units (14a, 14b) to the surface of the bumper (1), to project the light beams from a light projecting surface (12a) to the outside of the vehicle.

14 Claims, 6 Drawing Sheets

(51) Int. Cl.
     *B60R 21/00*     (2006.01)
     *G01S 7/521*     (2006.01)
     *G01S 15/93*     (2006.01)
     *B60R 19/50*     (2006.01)
     *B60R 21/013*     (2006.01)

(52) U.S. Cl.
     CPC ............ *B60R 21/00* (2013.01); *B60R 21/013* (2013.01); *G01S 7/521* (2013.01); *G01S 15/931* (2013.01); *B60R 2019/505* (2013.01); *G01S 2015/937* (2013.01); *G01S 2015/938* (2013.01)

(58) Field of Classification Search
     USPC ........................................................ 340/435
     See application file for complete search history.

(56) References Cited

FOREIGN PATENT DOCUMENTS

DE     102012025490 A1     6/2014
JP     2005-178536 A     7/2005

* cited by examiner

ULTRASONIC SENSOR AND OBSTACLE DETECTION APPARATUS

TECHNICAL FIELD

This disclosure relates to an ultrasonic sensor, and an obstacle detection apparatus that is provided with an ultrasonic sensor and configured to detect an obstacle.

BACKGROUND ART

Conventionally, a vehicle-mounted ultrasonic sensor vibrates a diaphragm made of materials, such as aluminum, which do not allow light to pass therethrough, by using a ceramic resonator or the like, thereby transmitting/receiving ultrasonic waves through the diaphragm toward the surroundings of the vehicle. An obstacle detection apparatus detects an obstacle in the area surrounding the vehicle on the basis of a result of the transmission and reception of the ultrasonic wave that returns after being transmitted by the ultrasonic sensor and reflected by the obstacle. When detecting an obstacle in the area surrounding the vehicle by using the ultrasonic sensor, the obstacle detection apparatus urges the driver to pay attention to the obstacle by, for example, outputting a buzzer sound from a speaker or blinking a warning light, in the vehicle cabin.

Further, in an obstacle detection apparatus for vehicles described in Patent Literature 1, for example, a transmission and reception unit and a light emitting diode (LED) are contained in a bezel for fixing an ultrasonic sensor to a bumper. This bezel is made of an optically transparent material, and projects light emitted by an LED included therein to the outside of the vehicle, via a portion disposed around an optically non-transparent transmission and reception unit, which is a diaphragm made of aluminum. By projecting light emitted by the LED from the bezel surrounding the diaphragm made of aluminum to the outside of the vehicle when an obstacle is detected, it is possible to inform the outside of the vehicle that the vehicle is approaching.

CITATION LIST

Patent Literature

Patent Literature 1: Japanese Unexamined Patent Application Publication No. 2005-178536

SUMMARY OF INVENTION

Technical Problem

Conventionally, the area of the bezel which is exposed on the surface of the bumper is reduced in order to make the ultrasonic sensor mounted in the surface of the bumper unnoticeable. Therefore, a problem with the structure, as disclosed in above-explained Patent Literature 1, in which light emitted by an LED is simply passed through a bezel is that the area of a portion from which the light is projected is small, and the light is not prominent when viewed from the outside of the vehicle.

Embodiments of this disclosure have been made in order to solve the above-explained problem, and it is therefore an object of this disclosure to improve the visibility of an ultrasonic sensor that projects light to the outside of the vehicle to indicate an existence of a vehicle to pedestrians outside the vehicle and passengers in surrounding vehicles and to call their attention.

Solution to Problem

An ultrasonic sensor according to this disclosure includes: a transducer for transmitting and receiving an ultrasonic wave; one or more light sources to be mounted in a back side of a bumper; and an optical element configured in such a manner that at least a part of the optical element is exposed on a front surface of the bumper, wherein the optical element is configured to guide light emitted by the one or more light sources to a front surface of the bumper and to project the light to an outside of the vehicle.

Advantageous Effects of Invention

According to an aspect of embodiments, because the optical unit, at least apart of which is exposed on the surface of the bumper, guides the light emitted by the one or more light source units to the surface of the bumper, to project the light to the outside of the vehicle, the light projected from the ultrasonic sensor to the outside of the vehicle can be made to be prominent, and the visibility of the ultrasonic sensor can be improved. Further, by projecting light to indicate that the ultrasonic sensor is operating, pedestrians outside the vehicle and passengers in surrounding vehicles can be notified of the behavior of the vehicle and pay attention to the vehicle.

DESCRIPTION OF EMBODIMENTS

Hereafter, in order to explain this disclosure in greater detail, embodiments according to the disclosure will be described with reference to the accompanying drawings.

Embodiment 1

Figure 1:
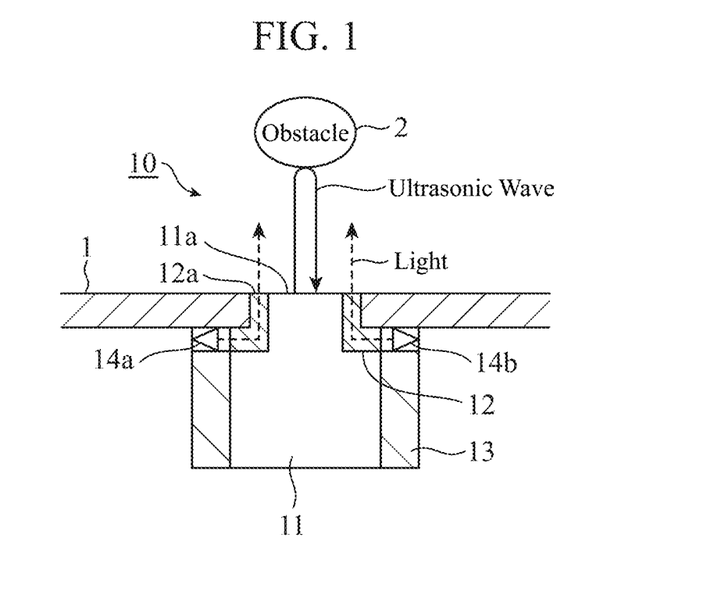
FIG. 1 is a cross-sectional view showing an example of the structure of an ultrasonic sensor according to Embodiment 1 of this disclosure.

FIG. 1 is a cross-sectional view showing an example of the structure of an ultrasonic sensor 10 according to Embodiment 1. The ultrasonic sensor 10 includes a transmission and reception unit 11 for transmitting and receiving ultrasonic waves, a holder 12 and an attachment 13 for attaching the transmission and reception unit 11 to the bumper 1 of a vehicle, and light source units 14a and 14b arranged in the back side of the bumper 1. The holder 12 and the attachment 13 are attachment members. Further, the holder 12 functions as an optical unit for guiding light emitted by the light source units 14a and 14b to the front of the bumper 1, and projects the light to the outside of the vehicle.

The transmission and reception unit 11 includes a casing which is formed using a material, such as aluminum, which does not allow light to pass therethrough. Within the casing there are housed an oscillator, such as a piezoelectric element, and a transmission and reception circuit, for example. A vibrating surface 11a of the casing is exposed on the surface of the bumper 1. Inside the vibrating surface 11a there is arranged an unillustrated oscillator comprising a piezoelectric element, and the oscillator and the vibrating surface 11a can vibrate integrally. The transmission and reception circuit vibrates the oscillator to cause the vibrating surface 11a to vibrate and transmit ultrasonic waves to the outside of the vehicle. Ultrasonic waves that reflect on an obstacle 2 move (vibrate) the vibrating surface 11a, and are received by the oscillator and converted by the transmission and reception circuit into electric signals to be outputted as ultrasonic signals.

The attachment 13 is formed using a member, such as an opaque, stiff resin. The attachment 13 is adhered to the back of the bumper 1 with the transmission and reception unit 11 housed therein. Note that the attachment 13 may be fixed to the back of the bumper 1 by using a method, such as screwing, other than adhesion. The holder 12 is formed using a member, such as a transparent, elastic rubber or resin. The holder 12 is arranged between a hole of the bumper 1 and the casing of the transmission and reception unit 11. Because of a frictional force and an elastic force of the holder 12, the transmission and reception unit 11 is held with respect to the bumper 1.

In the attachment 13, the light source units 14a and 14b, such as LEDs, are mounted at positions facing the holder 12. The holder 12 functions as an optical unit 15, and has a light projecting surface 12a exposed on the surface of the bumper 1 from the hole formed in the bumper 1. The holder 12 guides the light emitted by the light source units 14a and 14b, and projects the light from the light projecting surface 12a exposed on the surface of the bumper 1 to the outside of the vehicle. Because the light projecting surface 12a is shaped like a ring surrounding the vibrating surface 11a of the transmission and reception unit 11 on the surface of the bumper 1, the light projecting surface looks as if it shines in the shape of a ring when the surface of the bumper 1 is viewed from the outside of the vehicle. By increasing the area of this light projecting surface 12a, the light emission can be made to be more prominent.

Figure 2:
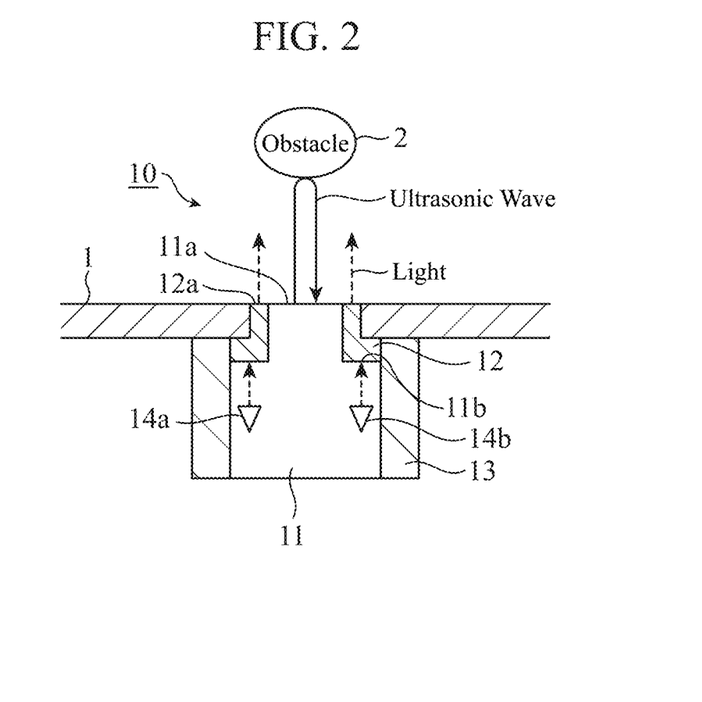
FIG. 2 is a cross-sectional view showing a variant of the ultrasonic sensor according to Embodiment 1.

FIG. 2 is a cross-sectional view showing a variant of the ultrasonic sensor 10 according to Embodiment 1. In the example shown in FIG. 2, the light source units 14a and 14b are provided inside the casing for the transmission and reception unit 11. At positions of the casing corresponding to the light source units 14a and 14b and the holder 12 there are formed holes 11b. Beams of Light emitted by the light source units 14a and 14b are incident upon the holder 12 via these holes 11b, and are guided to the surface of the bumper 1 and are projected to the outside of the vehicle from the holder 12.

Although in the examples shown in FIGS. 1 and 2, the light source units 14a and 14b are mounted, more light source units may be mounted. As an alternative, the number of light source units may be one. Further, the light source units 14a and 14b may be arranged at any location as long as they are mounted behind the bumper 1, and thus the arrangement of them is not limited to examples shown in FIGS. 1 and 2.

Next, an obstacle detection apparatus 20 which uses the ultrasonic sensor 10 will be explained.

Figure 3:
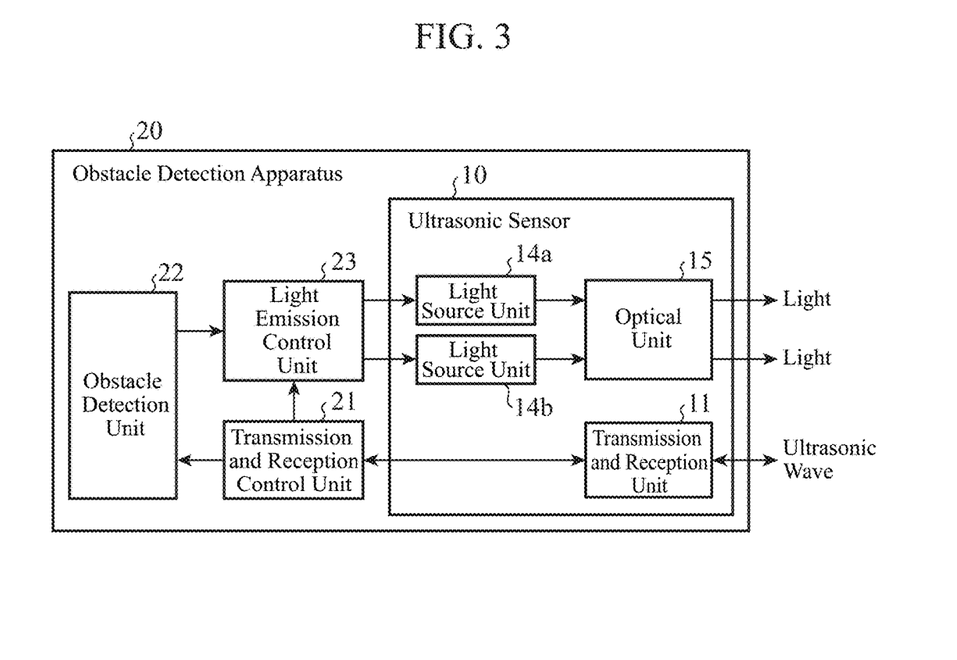
FIG. 3 is a block diagram showing exemplary configurations of the ultrasonic sensor according to Embodiment 1 and of an obstacle detection apparatus according to Embodiment 1 provided with the ultrasonic sensor.

FIG. 3 is a block diagram showing an exemplary configuration of the obstacle detection apparatus 20 which uses the ultrasonic sensor 10 according to Embodiment 1. The obstacle detection apparatus 20 includes the ultrasonic sensor 10, a transmission and reception control unit 21, an obstacle detection unit 22, and a light emission control unit 23. The optical unit 15 shown in FIG. 3 corresponds to the holder 12 shown in FIGS. 1 and 2.

The transmission and reception control unit 21 outputs instructions to the transmission and reception unit 11 of the ultrasonic sensor 10 to transmit ultrasonic waves. When instructing the transmission and reception unit 11 to transmit an ultrasonic wave, the transmission and reception control unit also outputs to the light emission control unit 23 a notification informing of transmission of an ultrasonic wave. In accordance with the instructions from the transmission and reception control unit 21, the transmission and reception unit 11 vibrates the vibrating surface 11a to transmit an ultrasonic wave to the outside of the vehicle. After that, the transmission and reception unit 11 receives the ultrasonic wave that is reflected from an obstacle 2 through the vibrating surface 11a, and converts the received ultrasonic wave into an electric signal and outputs the electric signal to the transmission and reception control unit 21.

The transmission and reception control unit 21 receives the electric signal from the transmission and reception unit 11, and measures a time from the transmission to the reception of the ultrasonic wave. Subsequently, the transmission and reception control unit 21 calculates a range from the vibrating surface 11a to the obstacle 2 on the basis of the measured time, and outputs the range to the obstacle detection unit 22.

The obstacle detection unit 22 receives a result of the calculation of the range from the transmission and reception control unit 21. When this range is equal to or less than a predetermined range, the obstacle detection unit 22 detects that an obstacle 2 exists in an area surrounding the vehicle. The obstacle detection unit 22 then outputs to the light emission control unit 23 a notification informing of a detection of an obstacle 2.

When receiving from the transmission and reception control unit 21 the notification informing of the transmission of an ultrasonic wave, the light emission control unit 23 outputs an instruction to emit light to the light source unit 14a of the ultrasonic sensor 10. Further, when receiving from the obstacle detection unit 22 the notification informing of detection of the obstacle 2, the light emission control unit 23 outputs an instruction to emit light to the light source unit 14b of the ultrasonic sensor 10. The light source unit 14a or 14b emits light in accordance with the instruction from the light emission control unit 23. The light emitted by the light source unit 14a or 14b is guided to the surface of the bumper 1 and is projected to the outside of the vehicle by the holder 12 which is the optical unit 15.

By projecting the light emitted by the light source unit 14a to the outside of the vehicle when the ultrasonic sensor 10 transmits an ultrasonic wave, pedestrians and so on in an area surrounding the vehicle can be notified that an obstacle detecting operation is being performed.

Further, by projecting the light emitted by the light source unit 14b to the outside of the vehicle when the obstacle detection apparatus 20 has detected an obstacle 2, a pedestrian or the like who has been detected as the obstacle 2 can be notified that the vehicle is approaching.

Here, in the structure as shown in FIGS. 1 and 2, the ring-shaped light projecting surface 12a formed at the perimeter of the ultrasonic sensor 10 is configured to be able to project light emitted from either of the light source units 14a and 14b. Further, the light emission color of the light source unit 14a that emits light when an ultrasonic wave is transmitted is set to green, while the light emission color of the light source unit 14b that emits light when an obstacle 2 has been detected is set to yellow, for example. As a result, when an ultrasonic wave is transmitted, green light can be projected from the light projecting surface 12a, and, when an obstacle 2 is detected, yellow light can be projected from the light projecting surface 12a.

Further, the above light projecting surface 12a may be divided, for example, into two portions to provide two arc-shaped light projecting surfaces. The light emitted by the light source units 14a and 14b are projected from the arc-shaped light projecting surfaces, which correspond to the light source units, formed at the perimeter of the ultrasonic sensor 10. As a result, when an ultrasonic wave is transmitted, the light emitted by the light source unit 14a can be projected from one of the arc-shaped light projecting surfaces, and, when an obstacle 2 is detected, the light emitted by the light source unit 14b can be projected from the other one of the arc-shaped light projecting surfaces.

The mode of light emission by the light source units 14a and 14b may be one other than the above-explained light emission modes. For example, when an ultrasonic wave is transmitted, the light source units 14a and 14b can be made to emit light simultaneously, and, when an obstacle 2 is detected, the light source units 14a and 14b can be made to alternately emit light.

With such configuration, the light projection from the light projecting surface 12a can be made to be more prominent, and a notification can be provided for pedestrians and so on more certainly.

Although not illustrated, when the obstacle detection unit 22 detects an obstacle 2, the obstacle detection apparatus 20 may output a buzzer sound from a speaker in a vehicle cabin, or blink a warning light in the vehicle cabin, thereby calling the driver's attention. By causing both the driver and pedestrians to share information about the detection of an obstacle 2, the occurrence of an accidental contact or the like can be prevented.

Further, in a case in which a plurality of ultrasonic sensors 10 is mounted in the surface of the bumper 1, the obstacle detection apparatus 20 can control transmission and reception of an ultrasonic wave, light-emitting timing, and control the light emission color for each of the plurality of ultrasonic sensors 10. In this configuration, the obstacle detection apparatus 20 may control only an ultrasonic sensor 10 that detects an obstacle 2 to project light. Alternatively, when an obstacle 2 is detected by any one of the ultrasonic sensors 10, the obstacle detection apparatus 20 may control not only the ultrasonic sensors 10 that detected it but also the other ultrasonic sensors 10 to project light in a coordinated manner.

Next, an example of the hardware configuration of the obstacle detection apparatus 20 will be explained.

Figure 4:
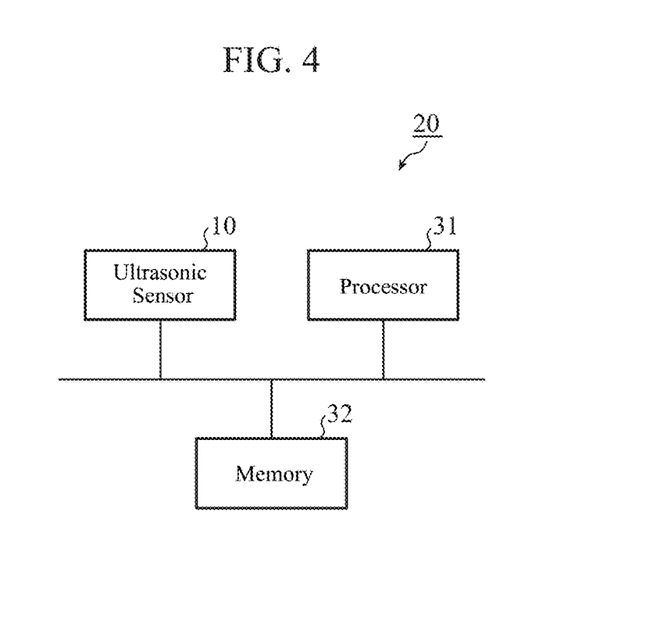
FIG. 4 is a diagram showing an exemplary hardware configuration of the obstacle detection apparatus according to Embodiment 1.

FIG. 4 is a diagram showing an example of the hardware configuration of the obstacle detection apparatus 20 according to Embodiment 1. Each function of the transmission and reception control unit 21, the obstacle detection unit 22, and the light emission control unit 23 of the obstacle detection apparatus 20 is implemented by one or more processing circuits. More specifically, the obstacle detection apparatus 20 includes a processing circuit that controls the transmission and reception of an ultrasonic wave by the transmission and reception unit 11, and that detects an obstacle 2 by using a result of the transmission and reception of an ultrasonic wave by the transmission and reception unit 11, and a processing circuit that causes the light source unit 14a to emit light when the transmission and reception unit 11 transmits an ultrasonic wave, and that causes the light source unit 14b to emit light when an obstacle 2 is detected. The processing circuits comprise a processor 31 that executes a program stored in a memory 32.

Each function of the transmission and reception control unit 21, the obstacle detection unit 22, and the light emission control unit 23 is implemented by software, firmware, or a combination of software and firmware. The software or the firmware is described as a program, and is stored in the memory 32. The processor 31 implements the function of each unit by reading and executing the program stored in the memory 32. More specifically, the obstacle detection apparatus 20 includes the memory 32 that stores the program in which a step of controlling the transmission and reception of an ultrasonic wave by the transmission and reception unit 11, a step of detecting an obstacle 2 by using a result of the transmission and reception of an ultrasonic wave by the transmission and reception unit 11, and a step of causing the light source unit 14a or 14b to emit light in accordance with the state of the transmission and reception unit 11 are carried out, as a result, when the program is executed by the processor 31. It can be said that this program is provided to cause a computer to execute procedures or methods by which the transmission and reception control unit 21, the obstacle detection unit 22, and the light emission control unit 23 operate.

The processor 31 is called a central processing unit (CPU), a processing apparatus, an arithmetic apparatus, a microprocessor, a microcomputer, or a digital signal processor (DSP).

The memory 32 can be, for example, a non-volatile or volatile semiconductor memory, such as a random access memory (RAM), a read only memory (ROM), a flash memory, an erasable programmable ROM (EPROM), or an Electrically EPROM (EEPROM), or a magnetic disk, such as a hard disk or a flexible disk.

As explained above, the ultrasonic sensor 10 according to Embodiment 1 includes the transmission and reception unit 11 that transmits and receives an ultrasonic wave, the holder 12 and the attachment 13 that fix the transmission and reception unit 11 to the bumper 1, and the light source units 14a and 14b mounted in the back side of the bumper 1. The holder 12 is shaped so as to be exposed on the surface of the bumper 1, and functions as the optical unit 15 that guides the light emitted by the light source units 14a and 14b to the surface of the bumper 1, and projects the light to the outside of the vehicle. With this configuration, the light projected from the ultrasonic sensor 10 to the outside of the vehicle can be made to be prominent, and the visibility of the ultrasonic sensor 10 can be improved. Further, by using the light projection to explicitly show that the ultrasonic sensor 10 is operating, pedestrians outside the vehicle and passengers in surrounding vehicles can be notified of the behavior of the vehicle and pay attention to the vehicle.

Further, the obstacle detection apparatus 20 according to Embodiment 1 includes the above-explained ultrasonic sensor 10, the transmission and reception control unit 21 that controls the transmission and reception of an ultrasonic wave by the transmission and reception unit 11, the obstacle detection unit that detects an obstacle 2 by using a result of the transmission and reception of an ultrasonic wave by the transmission and reception unit 11, and the light emission control unit 23 that causes the light source unit 14a to emit light when the transmission and reception unit 11 transmits an ultrasonic wave, and that causes the light source unit 14b to emit light when the obstacle detection unit 22 detects an obstacle 2. With this configuration, pedestrians outside the vehicle, passengers in surrounding vehicles, and so on can be notified that an obstacle detecting operation is being performed. Further, a pedestrian outside the vehicle who is detected as an obstacle 2, passengers in surrounding vehicles, and so on can be notified that the vehicle is approaching.

The holder 12 that functions as the optical unit 15 can be provided with a function of serving as a light scattering portion that scatters light. Variants of the holder 12 are shown in FIG. 5.

Figure 5A:
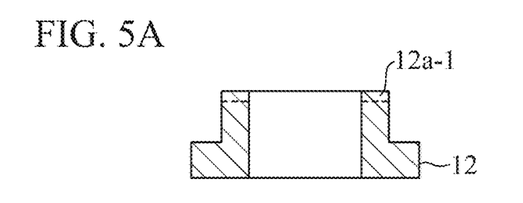
FIGS. 5A and 5B each show a cross-sectional view showing a variant of a holder of the ultrasonic sensor according to Embodiment 1.

In a variant shown in FIG. 5A, at least the light projecting surface 12a of the holder 12 exposed on the surface of the bumper 1 is made of a semi-transparent member 12a-1, such as a milky-white resin. A portion of the holder 12 except the semi-transparent member 12a-1 is made of, for example, a transparent light transmission material. The portion which is made of the semi-transparent member 12a-1 functions as the light scattering portion. Although not illustrated, the whole of the holder 12 can be made of a semi-transparent material.

Figure 5B:
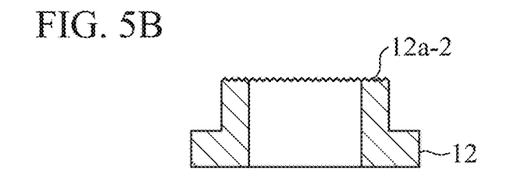

In a variant shown in FIG. 5B, the holder 12 is made of, for example, a transparent light transmission material. Microscopic bumps 12a-2 are formed on at least the light projecting surface 12a of the holder 12 exposed on the surface of the bumper 1, so that the light projecting surface is formed like ground glass. The portion on which the microscopic bumps 12a-2 are formed functions as the light scattering portion.

By constructing the holder 12 in such a way that the holder has a function of serving as a light scattering portion, light can be projected in a wide angle. Therefore, the light projected from the surface of the bumper 1 to the outside of the vehicle can be made to be prominent over a wider angle. Further, by scattering the light, the nonuniformity of the light is reduced and the designability as lighting is improved.

Further, the holder 12 that functions as the optical unit 15 may be provided with an optical property to diffuse or condense light. A variant of the holder 12 is shown in FIG. 6.

Figure 6:
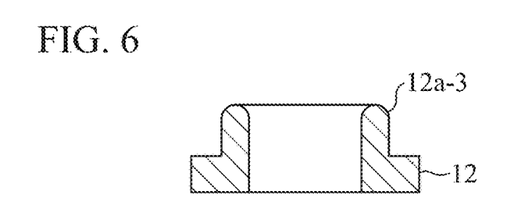
FIG. 6 is a cross-sectional view showing another variant of the holder of the ultrasonic sensor according to Embodiment 1.

In the variant shown in FIG. 6, the holder 12 is made of a light transmission material. A convex lens 12a-3 is formed in at least the light projecting surface 12a of the holder 12, the light projecting surface being exposed on the surface of the bumper 1. The convex lens 12a-3 has an optical property to diffuse light to be projected to the outside of the vehicle.

Although not illustrated, the light projecting surface 12a of the holder 12 can be provided with an optical property to diffuse or condense light by forming, on the light projecting surface, a concave lens, any polyhedral shape such as a brilliant cut, a prism, or an embossment.

By constructing the holder 12 in such a way that the holder has an optical property to diffuse light, light can be projected over a wide angle. Further, by constructing the holder 12 in such a way that the holder has an optical property to condense light, light can be projected to a distant place. Therefore, the angle at which light is projected and the direction in which light is projected can be set at will.

With the ultrasonic sensor 10 comprising the configuration above, light projected to the outside of the vehicle can be made to be prominent to explicitly show that the ultrasonic sensor 10 is operating. As a result, pedestrians outside the vehicle and passengers in surrounding vehicles can be notified of the behavior of the vehicle and pay attention to the vehicle.

Embodiment 2

Although an example of the structure of using the holder 12 and the attachment 13 as the attachment members for fixing the transmission and reception unit 11 to the bumper 1 is shown in above-explained Embodiment 1, an example of a configuration of using a holder and a bezel as attachment members will be shown in Embodiment 2.

Figure 7:
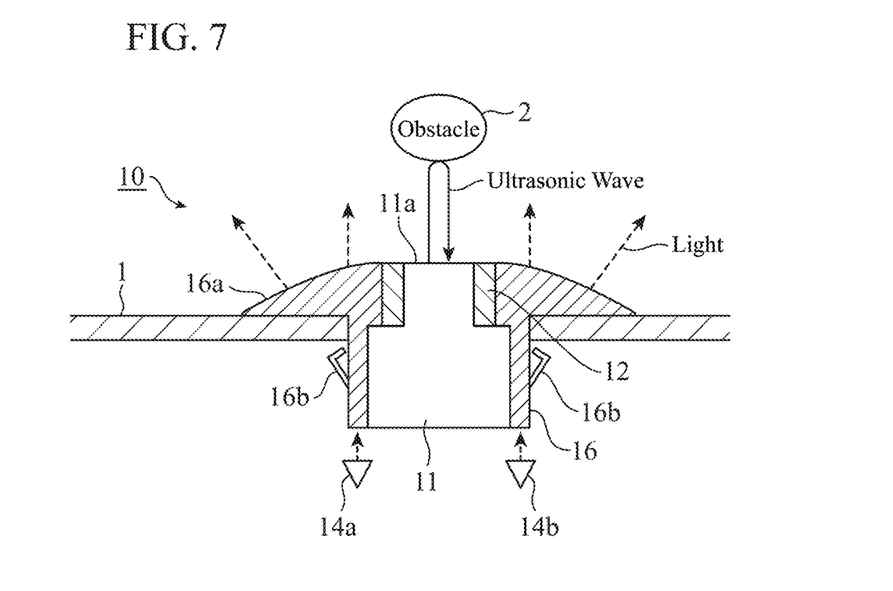
FIG. 7 is a cross-sectional view showing an example of the structure of an ultrasonic sensor according to Embodiment 2 of this disclosure.

FIG. 7 is a cross-sectional view showing an example of the structure of an ultrasonic sensor 10 according to Embodiment 2. In FIG. 7, the same components as those of FIGS. 1 to 6 or like components are denoted by the same reference numerals, and the explanation of such components will be omitted hereafter.

The ultrasonic sensor 10 according to Embodiment 2 has a structure of using a holder 12 and a bezel 16 as the attachment members. This bezel 16 functions as an optical unit 15.

The bezel 16 is formed using a light transmission material, such as a transparent resin, which allows light to pass therethrough. This bezel 16 is cylindrical and has a light projecting surface 16a formed at one end thereof and having a larger diameter than a hole of a bumper 1. Further, plural holding springs 16b are formed in a side surface of the bezel 16. The bezel 16 is mounted into the hole of the bumper 1 from a surface of the bumper, and is fixed in a state in which the light projecting surface 16a and the holding springs 16b sandwich the bumper 1 therebetween. A transmission and reception unit 11 is contained inside the bezel 16. Further, the holder 12 is mounted between the bezel 16 and the transmission and reception unit 11, and the transmission and reception unit 11 is held with respect to the bezel 16 by a frictional force and an elastic force of the holder 12.

Light source units 14a and 14b are mounted in the back side of the bumper 1. As a method of holding the light source units 14a and 14b in the back side of the bumper 1, any type of method can be used. It is assumed that the light source units 14a and 14b are held in the back side of the bumper 1 by, for example, a not-illustrated portion of the bezel 16. Further, although in the example shown in FIG. 7, the light source units 14a and 14b are mounted, a larger number of light source units can be mounted. As an alternative, the number of light source units can be one.

In addition, the holder 12 according to Embodiment 2 can be formed using either a material which does not allow light to pass therethrough or a material which allows light to pass therethrough.

The bezel 16 functions as the optical unit 15, guides light emitted by the light source units 14a and 14b to the surface of the bumper 1 and projects the light beams from the light projecting surface 16a to the outside of the vehicle. Because this light projecting surface 16a is shaped like a ring which encloses a vibrating surface 11a of the transmission and reception unit 11, the light projecting surface looks as if it shines in the shape of a ring when the surface of the bumper 1 is viewed from outside the vehicle. By increasing the area of this light projecting surface 16a, the light emission can be made to be more prominent.

As explained above, the ultrasonic sensor 10 according to Embodiment 2 is constructed so as to include the transmission and reception unit 11 that transmits and receives an ultrasonic wave, the holder 12 and the bezel 16 that fix the transmission and reception unit 11 to the bumper 1, and the light source units 14a and 14b mounted in the backside of the bumper 1. The bezel 16 is shaped so as to be exposed on the surface of the bumper 1, and functions as the optical unit that guides the light emitted by the light source units 14a and 14b to the surface of the bumper 1, and projects the light to the outside of the vehicle. Although the explanation of the light emitting operation will be omitted hereafter because the light emitting operation of each light source unit is the same as that of each light source unit according to above-explained Embodiment 1, the structure according to Embodiment 2 makes it possible to make the light projected from the surface of the bumper 1 to the outside of the vehicle more prominent than that projected by the structure according to above-explained Embodiment 1.

The bezel 16 that functions as the optical unit 15 can be provided with a function of serving as a light scattering portion that scatters light.

For example, at least the light projecting surface 16a of the bezel 16, the light projecting surface being exposed on the surface of the bumper 1, is made of a semi-transparent member, and this semi-transparent member functions as the light scattering portion. The whole of the bezel 16 can be made of a semi-transparent material.

Further, for example, microscopic bumps can be formed on at least the light projecting surface 16a of the bezel 16, the light projecting surface being exposed on the surface of the bumper 1, and the portion on which the microscopic bumps are formed can function as the light scattering portion.

Further, the bezel 16 that functions as the optical unit 15 can be provided with an optical property to diffuse or condense light.

For example, the bezel 16 is made of alight transmission material and a convex lens is formed in the light projecting surface 16a. The convex lens has an optical property of diffusing light to be projected to the outside of the vehicle.

Further, for example, the light projecting surface 16a of the bezel 16 can be provided with an optical property to diffuse or condense light by forming in the light projecting surface a concave lens, any polyhedral shape such as a brilliant cut, a prism, or an embossment.

Embodiment 3

Although examples of the structure of projecting light in a specific direction from the ultrasonic sensor 10 are shown in above-explained Embodiments 1 and 2, an example of a structure of providing a larger number of light source units and a larger number of light projecting surfaces, and projecting light in any directions will be shown in Embodiment 3.

Figure 8:
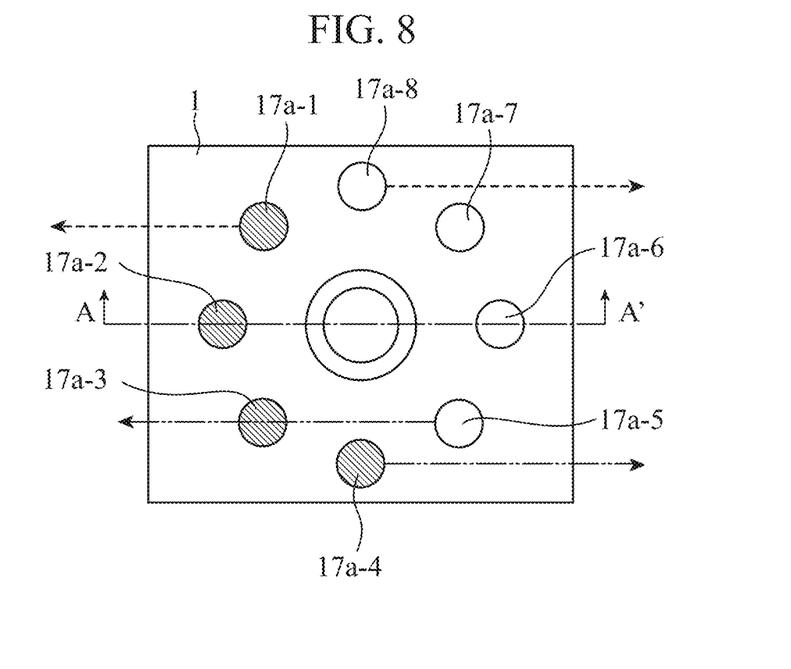
FIG. 8 is a diagram showing an ultrasonic sensor according to Embodiment 3 of this disclosure which is viewed from a front surface side of a bumper.
Figure 9:
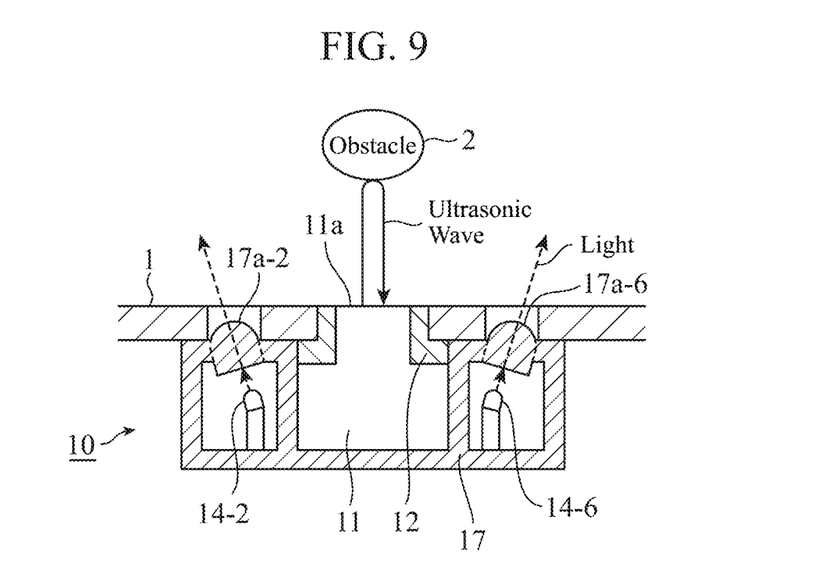
FIG. 9 is a cross-sectional view showing an example of the structure of the ultrasonic sensor according to Embodiment 3.

FIG. 8 is a diagram of an ultrasonic sensor 10 according to Embodiment 3 which is viewed from a surface of a bumper 1. FIG. 9 is a cross-sectional view of the ultrasonic sensor 10 taken along the A-A' line of FIG. 8. In FIGS. 8 and 9, the same components as those of FIGS. 1 to 7 or like components are denoted by the same reference numerals, and the explanation of such components will be omitted hereafter.

The ultrasonic sensor 10 according to Embodiment 3 has a structure of using a holder 12 and an attachment 17 as attachment members. A part of this attachment 17 functions as an optical unit 15.

Further, because an obstacle detection apparatus 20 according to Embodiment 3 has the same configuration as the obstacle detection apparatus 20 according to Embodiment 1 shown in FIGS. 3 and 4 from a graphical point of view, an explanation will be made using FIGS. 3 and 4. It is assumed that in the obstacle detection apparatus 20 according to Embodiment 3, an obstacle detection unit 22 can determine a direction in which an obstacle 2 exists by using a result of the transmission and reception of an ultrasonic wave. Because a known technique can be applied to determine the direction of an obstacle 2, the explanation of the method will be omitted hereafter.

The attachment 17 is formed using a material which does not allow light to pass therethrough. This attachment 17 is fixed to the back of the bumper 1 in a state in which a transmission and reception unit 11 is contained therein.

One or more optical units 17a-1 to 17a-8 are formed, in a surface of this attachment 17 on the bumper 1 side, using a light transmission material which allows light to pass therethrough. These optical units 17a-1 to 17a-8 are arranged in such a way as to enclose a vibrating surface 11a of the transmission and reception unit 11 in the surface of the bumper 1. On the other hand, penetrating holes are formed at positions of the bumper 1 which are opposite to the optical units 17a-1 to 17a-8. Therefore, the optical units 17a-1 to 17a-8 which serve as light projecting surfaces are exposed on the surface of the bumper 1.

The optical units 17a-1 to 17a-8 function as the optical unit 15 shown in either the block diagram of FIG. 3 or a block diagram of FIG. 11 which will be explained below.

Further, a plurality of light source units 14 including light source units 14-2 and 14-6 is mounted inside the attachment 17. It is assumed in this embodiment that the plural light source units are mounted in such a way that the plural light source units correspond to the plural optical units, respectively. For example, as shown in FIG. 9, the light source unit 14-2 is mounted for the optical unit 17a-2, and the light source unit 14-6 is mounted for the optical unit 17a-6. Light emitted by the light source unit 14-2 is guided to the surface of the bumper 1 and is projected to the outside of the vehicle by the optical unit 17a-2. Similarly, light emitted by the light source unit 14-6 is guided to the surface of the bumper 1 and is projected to the outside of the vehicle by the optical unit 17a-6.

In the example of FIG. 9, each of the optical units 17a-1 to 17a-8 is a transparent convex lens, and focuses the light from the light source unit 14 and projects the light in an optical axis direction. By adjusting the direction of the optical axis of the convex lens, the direction of emission of the light can be set.

For example, as shown by broken lines in FIG. 8, the direction of emission of the light of each of the optical units 17*a*-1 to 17*a*-4 is oriented toward a left side of the vehicle and the direction of emission of the light of each of the optical units 17*a*-5 to 17*a*-8 is oriented toward a right side of the vehicle. When an obstacle 2 has been detected on the left side of the vehicle by the obstacle detection unit 22 of the obstacle detection apparatus 20, a light emission control unit 23 performs a control operation of causing the four light source units 14 which are paired with the optical unit 17*a*-1 to 17*a*-4 to emit light beams, to project the light beams to the left side of the vehicle. As a result, the light beams can be projected in the direction in which the obstacle 2 has been detected. For example, when a pedestrian has been detected as an obstacle 2, light beams can be projected toward the pedestrian and the pedestrian can be notified of an approach of the vehicle.

Further, for example, the directions of emission of the light beams of the optical units 17*a*-1 to 17*a*-4 can be oriented toward the right side of the vehicle, while the directions of emission of the light beams of the optical units 17*a*-5 to 17*a*-8 can be oriented toward the left side of the vehicle in such a way as to cross the above-mentioned directions of emission, as shown by chain double-dashed lines in FIG. 8. In this structure, when an obstacle 2 has been detected on the left side of the vehicle by the obstacle detection unit 22, the light emission control unit 23 performs a control operation of causing the four light source units 14 which are paired with the optical units 17*a*-4 to 17*a*-8 to emit light beams, to projects the light beams to the left side of the vehicle.

While the light emission control unit 23 performs the above-explained operation when an obstacle 2 has been detected, the light emission control unit can perform an operation of causing all the light source units 14 to emit light beams when an ultrasonic wave is transmitted from the transmission and reception unit 11.

Further, each of the optical units 17*a*-1 to 17*a*-8 can be constructed so as to have a function of serving as a light scattering portion, like those according to above-explained Embodiments 1 and 2, or can be constructed so as to have an optical property to diffuse or condense light.

As explained above, the ultrasonic sensor 10 according to Embodiment 3 is constructed so as to include the plural light source units 14 which can emit light beams individually. Further, the optical units 17*a*-1 to 17*a*-8 each of which is a light projecting surface from which light is projected in any direction are arranged while being brought into correspondence with the plural light source units 14, and light beams emitted by the light source units 14 are projected toward one or more directions. With these structures, light beams projected from the ultrasonic sensor 10 toward plural directions outside the vehicle can be made to be prominent.

Further, according to Embodiment 3, the optical units 17*a*-1 to 17*a*-8 project the light beams emitted by the plural light source units 14 toward one or more directions outside the vehicle. With this structure, light beams can be projected toward a direction in which an obstacle 2 has been detected.

According to above-explained Embodiment 3, the light emission control unit 23 is constructed so as to, when the obstacle detection unit 22 has detected an obstacle 2, control the directions of emission of light beams to the direction in which the obstacle 2 has been detected. By projecting light beams toward a pedestrian who has been detected as an obstacle 2 with this structure, thereby explicitly showing that the ultrasonic sensor 10 is operating, the pedestrian can be notified of the behavior of the vehicle and pay attention to the vehicle.

Embodiment 4

Although an example of the structure of the ultrasonic sensor 10 in which the directions in which light beams are projected are fixed is shown in the above-explained Embodiment 3, an example of a structure of being able to change the directions in which light beams are projected freely will be shown in Embodiment 4.

Figure 10:
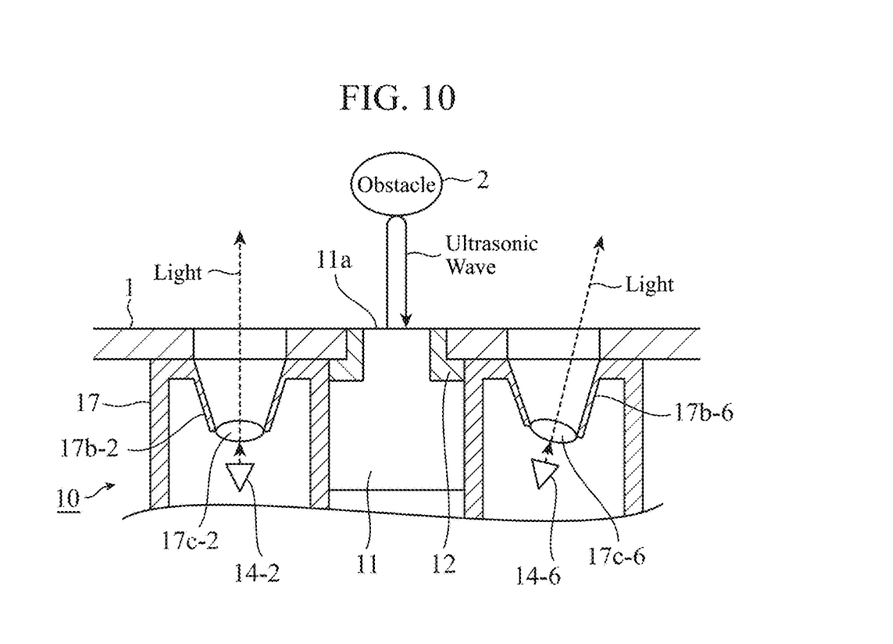
FIG. 10 is a cross-sectional view showing an example of the structure of an ultrasonic sensor according to Embodiment 4 of this disclosure.

FIG. 10 is a cross-sectional view of an ultrasonic sensor 10 according to Embodiment 4 taken along the A-A' line of FIG. 8. In FIG. 10, the same components as those of FIGS. 1 to 9 or like components are denoted by the same reference numerals, and the explanation of such components will be omitted hereafter.

The ultrasonic sensor 10 according to Embodiment 4 has a structure of using a holder 12 and an attachment 17 as attachment members. A plurality of convex lenses 17*c*, including convex lenses 17*c*-2 and 17*c*-6 of this attachment 17, functions as an optical unit 15.

Figure 11:
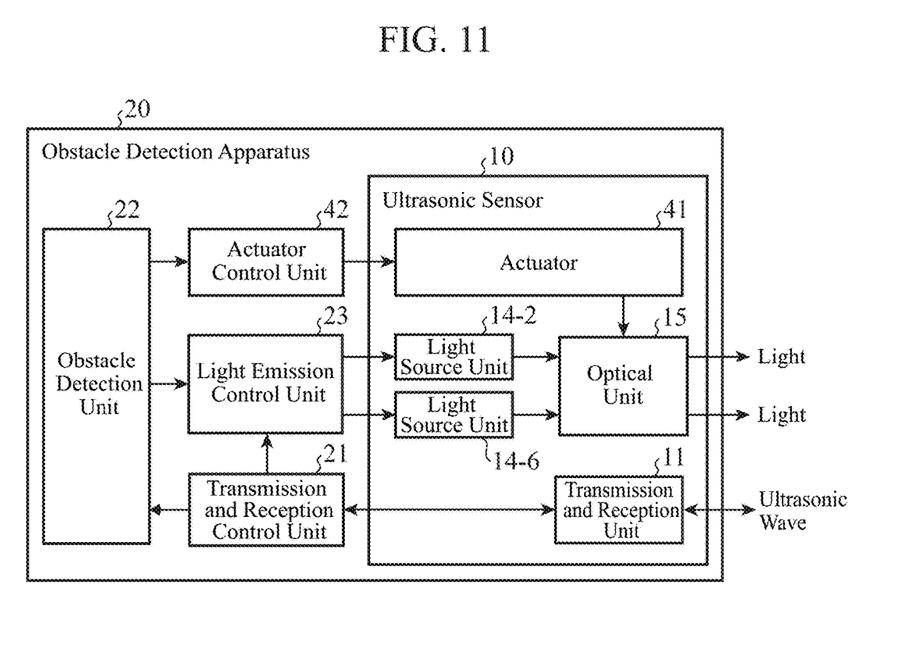
FIG. 11 is a block diagram showing an exemplary configuration of an obstacle detection apparatus according to Embodiment 4.

FIG. 11 is a block diagram showing an example of the structure of an obstacle detection apparatus 20 using the ultrasonic sensor 10 according to Embodiment 4. In FIG. 11, the same components as those of FIG. 3 or like components are denoted by the same reference numerals, and the explanation of such components will be omitted hereafter.

As shown in FIG. 11, the ultrasonic sensor 10 includes an actuator 41 that is configured to move light source units 14 and the optical unit 15, and to change the directions of emission of light beams. The actuator 41 is, for example, a motor and a peripheral mechanism of the motor that move convex lenses 17*c* which function as the optical unit 15 to any positions. In FIG. 11, only light source units 14-2 and 14-6 which are included in the light source units 14 are illustrated. Further, the obstacle detection apparatus 20 includes an actuator control unit 42 that is configured to control the actuator 41 of the ultrasonic sensor 10.

The attachment 17 except for the convex lenses 17*c*, which allows light to pass therethrough, is formed using a material which does not allow light to pass therethrough. The attachment 17 is fixed to the back of a bumper 1 in a state in which the attachment contains a transmission and reception unit 11.

In the attachment 17, tubed supporting portions 17*b* which can be bent freely are formed in a surface opposite the bumper 1. In FIG. 11, only two supporting portions 17*b*-2 and 17*b*-6 which are included in the plural supporting portions 17*b* are shown. Each supporting portion 17*b* has one end directed toward a light source unit 14 and supporting a transparent convex lens 17*c*, and the other end supporting the supporting portion itself. For example, the convex lenses 17*c* shown in FIG. 10 are arranged so as to enclose a vibrating surface 11*a* of the transmission and reception unit 11 in a surface of the bumper 1, like the optical units 17*a*-1 to 17*a*-8 shown in FIG. 8. The convex lenses 17*c* shown in FIG. 10 are the optical unit 15 shown in FIG. 11.

Penetrating holes are formed at positions in the bumper 1 which are opposite to the convex lenses 17*c*. Therefore, light projecting surfaces of the above-mentioned convex lenses 17*c* are exposed on the surface of the bumper 1. For example, the direction of emission of the light beam emitted by the light source unit 14-2 is controlled by the convex lens 17c-2, and the light beam is guided to the surface of the bumper 1 and is projected to the outside of the vehicle. Similarly, the direction of emission of the light beam emitted by the light source unit 14-6 is controlled by the convex lens 17c-6, and the light beam is guided to the surface of the bumper 1 and is projected to the outside of the vehicle.

The actuator 41 is configured to move the convex lens 17c-2 mounted at one end of the supporting portion 17b-2 freely. Further, the actuator 41 is configured to move the convex lens 17c-2 mounted at one end of supporting portion 17b-6 freely. As a result, the directions of the optical axes of the convex lenses 17c-2 and 17c-6 can be changed, thereby changing the directions of the light beams emitted by the light source units 14-2 and 14-6. Therefore, the directions of the light beams projected to the outside of the vehicle can be changed.

It is sufficient for the supporting portions 17b-2 and 17b-6 to cover gaps in such a way that the attachment 17 and so on cannot be seen via the holes of the bumper 1, with each one end supporting the convex lenses 17c-2 or 17c-6 moveably and each the other end being fixed to the attachment 17; the shapes of the supporting portions are not limited to the example illustrated.

Further, instead of mounting the convex lenses 17c-2 and 17c-6, the light sources 14-2 and 14-6 can be supported directly at ends of the supporting portions 17b-2 and 17b-6. Also in this structure, by moving the light source units 14-2 and 14-6 at ends of the supporting portions 17b-2 and 17b-6, the directions of the light beams projected to the outside of the vehicle can be changed.

In the obstacle detection apparatus 20 shown in FIG. 11, an obstacle detection unit 22 detects an obstacle 2 and determines the direction of the obstacle 2 by using a result of the transmission and reception of an ultrasonic wave. The obstacle detection unit 22 outputs a notification showing that an obstacle 2 has been detected to a light emission control unit 23, and outputs a notification showing the direction in which the obstacle 2 has been detected to the actuator control unit 42.

When receiving a notification showing that an obstacle 2 has been detected from the obstacle detection unit 22, the light emission control unit 23 outputs an instruction to emit light to the light source units 14-2 and 14-6 of the ultrasonic sensor 10. The light source units 14-2 and 14-6 emit light beams in accordance with the instruction from the light emission control unit 23.

When receiving a notification showing the direction in which the obstacle 2 has been detected from the obstacle detection unit 22, the actuator control unit 42 outputs to the actuator 41 an instruction to move the convex lenses 17c-2 and 17c-6 in such a way that the light beams projected from the convex lenses are oriented toward the direction. The actuator 41 moves the positions of the convex lenses 17c-2 and 17c-6 in accordance with the instruction from the actuator control unit 42.

As a result, the light beams emitted by the light source units 14-2 and 14-6 are guided and projected toward the direction of the obstacle 2 by the convex lenses 17c-2 and 17c-6.

While the light emission control unit 23 performs the above-mentioned operation when an obstacle 2 has been detected, the light emission control unit can perform an operation of causing all the light source units 14 to emit light beams when an ultrasonic wave is transmitted from the transmission and reception unit 11.

As explained above, according to Embodiment 4, the ultrasonic sensor 10 is constructed so as to include the supporting portions 17b that support the convex lenses 17c or the light source units 14 in a state in which the convex lenses or the light source units are oriented toward any directions, and the actuator 41 that changes the directions of light beams projected to the outside of the vehicle by changing the directions toward which the convex lenses 17c or the light source units 14 are oriented. With this structure, when a pedestrian has been detected as an obstacle 2, light can be projected toward the pedestrian. By explicitly showing that the ultrasonic sensor 10 is operating, the pedestrian can be notified of the behavior of the vehicle and pay attention to the vehicle.

Embodiment 5

In Embodiment 5, an example of a structure which gives perspective to light projected from an ultrasonic sensor 10 will be shown as an example of further providing an improvement in designability.

Figure 12:
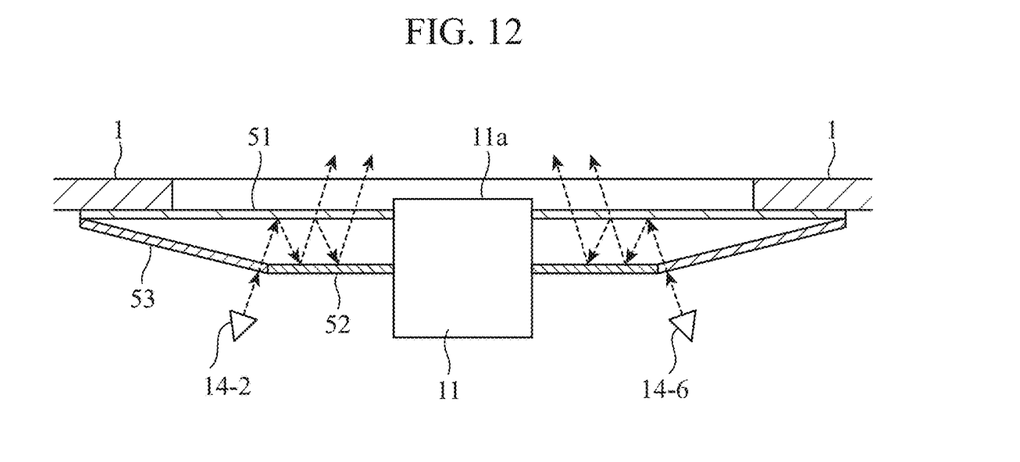
FIG. 12 is a cross-sectional view showing an example of the structure of an ultrasonic sensor according to Embodiment 5 of this disclosure.

FIG. 12 is a cross-sectional view of the ultrasonic sensor 10 according to Embodiment 5 taken along the A-A' line of FIG. 8. In FIG. 12, the same components as those of FIGS. 1 to 11 or like components are denoted by the same reference numerals, and the explanation of such components will be omitted hereafter.

The ultrasonic sensor 10 according to Embodiment 5 includes a half mirror portion 51, a mirror portion 52, and a light transmission portion 53. The half mirror portion 51 functions as a attachment member-cum-optical-unit 15. Further, the mirror portion 52 and the light transmission portion 53 function as an optical unit 15.

Each of the half mirror portion 51 and the mirror portion 52 may be metal plating or deposition layer which is formed on the front or rear surface of a transparent plate material.

Although the disc-shaped half mirror portion 51 and the mirror portion 52 are fixed like opposite mirrors in which their mirror surfaces are opposite to each other, both of them may be mirrors formed on the front and rear surfaces of a transparent plate material. The light transmission portion 53 which allows light to pass therethrough is disposed in an outer edge portion of the mirror portion 52. Further, a transmission and reception unit 11 is fixed to each central portion of the half mirror portion 51 and the mirror portion 52.

The half mirror portion 51 is adhered to the back of a bumper 1. A penetrating hole which exposes a light projecting surface of the half mirror portion 51 is formed at a position of the bumper 1 which is opposite to the light projecting surface. Further, plural light source units 14 are provided in the back side of the bumper 1. In FIG. 12, only light source units 14-2 and 14-6 included in the plural light source units 14 are shown. As a method of mounting the light source units 14 in the back side of the bumper 1, any type of method can be used. For example, it is assumed that the light source units are mounted in a not-illustrated portion of the half mirror portion 51 which also serves as a attachment member. For example, the plural light source units 14 are arranged in such a way as to enclose a vibrating surface 11a of the transmission and reception unit 11 in the surface of the bumper 1, like the optical units 17a-1 to 17a-8 shown in FIG. 8.

A part of light emitted by the light source unit 14-2 passes through the light transmission portion 53 and the mirror surface of the half mirror portion 51, and is projected to the outside of the vehicle. Further, light reflected by the half mirror portion 51 travels toward the mirror portion 52 which is opposite to the half mirror portion. The light which travels toward the mirror portion 52 is reflected by the mirror portion 52, and then travels toward the half mirror portion 51 again. Similarly, light emitted by the light source unit 14-6 also passes through the half mirror portion 51 and is projected to the outside of the vehicle while being repeatedly reflected between the half mirror portion 51 and the mirror portion 52.

Although the structure in which the light source units 14 are arranged in the shape of a circle around the light transmission portion 53 is shown above, any arrangement of the light source units 14 is possible. For example, the light source units can be arranged inside the half mirror portion 51 and the mirror portion 52.

Figure 13:
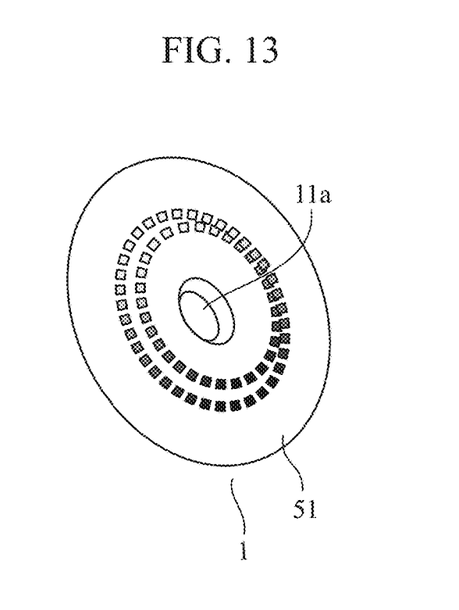
FIG. 13 is a diagram showing the ultrasonic sensor according to Embodiment 5 which is viewed from a front surface side of a bumper.

A view of the ultrasonic sensor 10 in which the light source units 14 are arranged in the shape of a single circle around the transmission and reception unit 11 and project light beams and which is viewed from the surface of the bumper 1 is shown in FIG. 13. An effect produced by the opposite mirrors configured by the half mirror portion 51 and the mirror portion 52 causes a plurality of virtual images of the light source units 14 arranged in the shape of a circle to appear in such a way as to enclose the vibrating surface 11a. As a result, a plurality of light circles having a depth appears around the transmission and reception unit 11, and the light emissions can be made to be prominent. Further, the opposite mirrors which are configured by the half mirror portion 51 and the mirror portion 52 make it possible to give perspective to the circles appearing, and the designability is improved.

A unique effect can be produced by causing the light source units 14 to emit light sequentially.

As explained above, according to Embodiment 5, the ultrasonic sensor 10 is constructed so as to have the half mirror portion 51 and the mirror portion 52 which are opposite to each other, and cause light beams emitted by the plural light source units 14 to be reflected multiple times between the half mirror portion and the mirror portion, to project the light beams from the half mirror portion 51 to the outside of the vehicle. With this structure, perspective can be given to light emissions and it can be explicitly shown that the ultrasonic sensor 10 is operating. As a result, pedestrians outside the vehicle and passengers in surrounding vehicles can be notified of the behavior of the vehicle and pay attention to the vehicle.

It is to be understood that any combination of the above-explained embodiments can be made freely, various modifications can be made to any component of the above-explained embodiments, and any component of the above-explained embodiments can be omitted within the scope of the invention.

INDUSTRIAL APPLICABILITY

Because the ultrasonic sensor according to the present disclosure is constructed so as to project light from a surface of a bumper to outside a vehicle, the ultrasonic sensor is suitable for use in an obstacle detection apparatus that urges pedestrians and surrounding vehicles to pay attention to the vehicle by projecting light, for example.

REFERENCE SIGNS LIST 1 bumper; 10 ultrasonic sensor; 11 transmission and reception unit (transducer); 11a vibrating surface; 11b hole; 12 holder [attachment member, optical unit (optical element)]; 12a, 16a light projecting surface; 12a-1 semi-transparent member; 12a-2 bumps; 12a-3 convex lens; 13, 17 attachment (attachment member); 14, 14a, 14b, 14-2, 14-6 light source unit; 15, 17a-1 to 17a-8 optical unit (optical element); 16 bezel [attachment member, optical unit (optical element)]; 16b holding spring; 17b-2, 17b-6 supporting portion; 17c-2, 17c-6 convex lens [optical unit (optical element)]; 20 obstacle detection apparatus; 21 transmission and reception control unit; 22 obstacle detection unit; 23 light emission control unit; 31 processor; 32 memory; 41 actuator; 42 actuator control unit; 51 half mirror portion [attachment member, optical unit (optical element)]; 52 mirror portion [optical unit (optical element)]; and 53 light transmission portion [optical unit (optical element)].

The invention claimed is:

1. An ultrasonic sensor configured to be fixed to a bumper of a vehicle, the ultrasonic sensor comprising:
   a transducer for transmitting and receiving an ultrasonic wave;
   one or more light sources to be mounted in a back side of the bumper; and
   an optical element for holding the transducer configured in such a manner that at least a part of the optical element is exposed on a front surface of the bumper, wherein the optical element is configured to guide light emitted by the one or more light sources to a front surface of the bumper and to project the light to an outside of the vehicle.

2. The ultrasonic sensor according to claim 1, wherein the optical element comprises a light scattering portion for scattering light to be projected to the outside of the vehicle.

3. The ultrasonic sensor according to claim 2, wherein the light scattering portion is a semi-transparent member.

4. The ultrasonic sensor according to claim 2, wherein the light scattering portion is a member having a front surface on which bumps are formed.

5. The ultrasonic sensor according to claim 1, wherein a light projecting surface of the optical element to be exposed on the front surface of the bumper has an optical property to diffuse or condense light.

6. The ultrasonic sensor according to claim 1, wherein the optical element has a mirror portion and a half mirror portion which are opposite to each other, and causes light emitted by the one or more light sources to be reflected between the mirror portion and the half mirror portion multiple times, to project the light from the half mirror portion to the outside of the vehicle.

7. The ultrasonic sensor according to claim 1, further comprising:
   a supporting portion for supporting either the optical element or the one or more light sources, with the optical element or the one or more light sources oriented to face any direction; and
   an actuator for changing a direction of the light projected to the outside of the vehicle by changing the direction toward which either the optical element or the one or more light sources are oriented.

8. The ultrasonic sensor according to claim 1, wherein the ultrasonic sensor includes a plurality of light sources that can emit light beams individually.

9. The ultrasonic sensor according to claim 8, wherein the optical element projects the light beams emitted by the light sources toward one or more directions.

10. An obstacle detection apparatus comprising:
    a transducer for transmitting and receiving an ultrasonic wave;

one or more light sources to be mounted in a back side of a bumper of a vehicle;

an optical element for holding the transducer configured in such a manner that at least a part of the optical element is exposed on a front surface of the bumper, wherein the optical element is configured to guide light emitted by the one or more light sources to a front surface of the bumper and to project the light to an outside of the vehicle;

a processor to execute a program; and a memory to store the program which, when executed by the processor, results in the processes of:

controlling transmission and reception of the ultrasonic wave by the transducer;

detecting an obstacle by using a result of transmission and reception of the ultrasonic wave by the transducer; and causing the one or more light sources to emit light when the transducer transmits the ultrasonic wave or when the obstacle detection unit detects an obstacle.

11. The obstacle detection apparatus according to claim 10, wherein the processor causes the one or more light sources to emit light in a predetermined mode.

12. The obstacle detection apparatus according to claim 10, further comprising a plurality of light sources configured to emit light with different light emission colors, wherein the processor controls light emissions by the plurality of light sources configured to emit light with different light emission colors, thereby controlling color of light beams to be projected to the outside of the vehicle.

13. The obstacle detection apparatus according to claim 10, wherein when the processor detects an obstacle, the processor controls a direction of emission of light to a direction in which the obstacle is detected.

14. An ultrasonic sensor configured to be fixed to a bumper of a vehicle, the ultrasonic sensor comprising:

a transducer for transmitting and receiving an ultrasonic wave;

a plurality of light sources; and an optical element for holding the transducer, the optical element being configured in such a manner that at least a part of the optical element is exposed on a front surface of the bumper to guide light emitted by the plurality of light sources to a front surface of the bumper and to project the light to an outside of the vehicle, wherein the optical element comprises a light scattering portion for scattering light to be projected to the outside of the vehicle.

* * * * *